US010875650B2

(12) United States Patent
Fullerton et al.

(10) Patent No.: US 10,875,650 B2
(45) Date of Patent: Dec. 29, 2020

(54) ROOM PARTION ASSEMBLIES, SYSTEMS, AND METHODS

(71) Applicant: THE BOEING COMPANY, Chicago, IL (US)

(72) Inventors: James A. Fullerton, Bothell, WA (US); Bobbie Lee Cole, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 314 days.

(21) Appl. No.: 15/886,048

(22) Filed: Feb. 1, 2018

(65) Prior Publication Data

US 2019/0233114 A1 Aug. 1, 2019

(51) Int. Cl.
*B64D 11/00* (2006.01)
*B64D 11/04* (2006.01)

(52) U.S. Cl.
CPC .......... *B64D 11/0023* (2013.01); *B64D 11/04* (2013.01); *B64D 2011/0038* (2013.01); *B64D 2011/0061* (2013.01)

(58) Field of Classification Search
CPC ................ B64D 11/0023; B64D 11/04; B64D 2011/0038; B64D 2011/0061
USPC ....................................................... 244/118.5
See application file for complete search history.

(56) References Cited

U.S. PATENT DOCUMENTS 1,940,862 A * 12/1933 Henderson ............... C03C 17/00
52/664
4,763,268 A * 8/1988 Itoh ........................ G01C 21/14
340/988
9,254,918 B2 2/2016 Young et al.
2013/0241247 A1 9/2013 Wallace
2016/0052633 A1* 2/2016 Lawson ................. B64D 11/00
244/118.6
2016/0298370 A1 10/2016 Druckman
2017/0088267 A1 3/2017 Dowty
2017/0283064 A1* 10/2017 Robinson ................ E05D 15/58

FOREIGN PATENT DOCUMENTS

| EP | 2783983 | 10/2014 |
| EP | 3225548 | 10/2017 |
| WO | WO 2005080196 | 9/2005 |
| WO | WO 2017066559 | 4/2017 |

OTHER PUBLICATIONS

Extended European Search Report for EP 19151177.3-1010, dated Jun. 5, 2019.

* cited by examiner

*Primary Examiner* — Claude J Brown
(74) *Attorney, Agent, or Firm* — The Small Patent Law Group LLC; Joseph M. Butscher

(57) ABSTRACT

A room partition assembly is configured to selectively convert an area within an internal cabin of a vehicle between a standard use and a non-standard use. The room partition assembly includes a mounting frame that is configured to be secured to a monument within the internal cabin, and a panel that is moveably coupled to the mounting frame. The panel is selectively moved between a retracted position and an extended position with respect to the mounting frame. The area is configured for the standard use when the panel is in the retracted position. The area is configured for the non-standard use when the panel is in the extended position.

20 Claims, 11 Drawing Sheets

ROOM PARTION ASSEMBLIES, SYSTEMS, AND METHODS

FIELD OF EMBODIMENTS OF THE DISCLOSURE

Embodiments of the present disclosure generally relate to room partition assemblies, systems, and methods, which may be used in confined spaces, such as within commercial aircraft, to selectively convert one or more areas between a standard use and a non-standard use.

BACKGROUND OF THE DISCLOSURE

Commercial aircraft are used to transport passengers between locations. Certain flights may be particularly long, such as transoceanic or other long-haul flights, lasting eight or more hours, for example. During such flights, certain passengers may desire to find a location onboard an aircraft that offers tranquility and silence.

As an example, individuals that practice certain religions may prefer or even be required by conscience to pray at various times during the day, even if onboard a commercial aircraft. One or more prayer times may occur during a particular flight, especially during long haul flights. However, an internal cabin of a commercial aircraft may not provide a location where individuals feel comfortable praying. Further, the internal cabin may not provide spaces for praying that are sufficiently private for certain individuals.

Additionally, attempts to create a space within an aircraft for prayer have typically removed revenue-generating seats from a cabin. For example, seats from a particular area within an internal cabin may be removed to create a dedicated prayer space.

SUMMARY OF THE DISCLOSURE

A need exists for an area onboard a vehicle (such as a commercial aircraft) that provides a tranquil, private area, which may be used for praying, mediation, and/or the like. Further, a need exists for a system and method of providing a private space onboard a vehicle. Moreover, a need exists for an area onboard a vehicle that may be converted between different uses. Also, a need exists for a dedicated space within an aircraft that may be used for prayer, meditation, and/or the like without reducing potential revenue.

With those needs in mind, certain embodiments of the present disclosure provide a room partition assembly that is configured to selectively convert an area within an internal cabin of a vehicle between a standard use and a non-standard use. The room partition assembly includes a mounting frame that is configured to be secured to a monument within the internal cabin, and a panel that is moveably coupled to the mounting frame. The panel is selectively moved between a retracted position and an extended position with respect to the mounting frame. The area is configured for the standard use when the panel is in the retracted position. The area is configured for the non-standard use when the panel is in the extended position.

In at least one embodiment, the mounting frame includes a support wall including a front surface connected to an opposed rear surface at a lower edge, an upper edge, an outer lateral edge, and an inner lateral edge, a lower bracket secured under and to the lower edge, and an upper bracket secured over and to the upper edge. Each of the lower bracket and the upper bracket comprises a track that is configured to slidably retain at least one portion of the panel.

In at least one embodiment, the panel includes a pattern of features. For example, the pattern of features includes a pattern of openings between and through a front surface and a rear surface of the panel. The pattern of openings are configured to provide lighting effects within the area when the panel is in the extended position, such that light passing through the pattern of openings provides the lighting effects. Additionally, pattern openings may allow cabin crew to discreetly monitor an occupant within an area. The pattern of features may include a pattern of diamond-shaped openings, or various other shapes and patterns. The features are configured to create an environment that is conducive to prayer and/or meditation.

The panel may be slidably coupled to the mounting frame. Optionally (or additionally), the panel may be pivotally coupled to the mounting frame.

The monument may be a galley or a closet within the internal cabin. The area within the internal cabin may include a direction finder including a plurality of directional indicia that are configured to indicate a direction towards a desired location outside of the vehicle.

Certain embodiments of the present disclosure provide a room partition method that is configured to selectively convert an area within an internal cabin of a vehicle between a standard use and a non-standard use. The room partition method includes securing a mounting frame to a monument within the internal cabin, moveably coupling a panel to the mounting frame, selectively moving the panel between a retracted position and an extended position with respect to the mounting frame, configuring the area for the standard use when the panel is in the retracted position, and configuring the area for the non-standard use when the panel is in the extended position.

Certain embodiments of the present disclosure provide a vehicle including an internal cabin having an area that is configured to be selectively converted between a standard use and a non-standard use, a monument within the internal cabin within or proximate to the area, and a direction finder secured to the monument. The direction finder includes a plurality of directional indicia that are configured to indicate a direction towards a desired location outside of the vehicle. A room partition assembly is configured to selectively convert the area between the standard use and the non-standard use.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a room partition assembly, system, and method that is configured to selectively convert an area onboard a vehicle between different uses. For example, the room partition assembly is configured to be retracted to allow the area to be used for ingress and egress. The room partition assembly is also configured to be extended to close the area off and provide a tranquil, relaxing, soothing, or other such private area for an individual. For example, the individual may peacefully pray within the closed off area when the room partition assembly is extended.

The room partition assembly includes a mounting frame, and a panel that is moveably coupled to the mounting frame. The panel is configured to be moved between a retracted position and an extended position in relation to the mounting frame. The panel may include a pattern of openings formed therethrough. In the extended position, the pattern of openings provides an aesthetically pleasing design. In at least one embodiment, light passing through the pattern of openings provides lighting effects within the closed off area. The lighting effects (such as a pattern of light and shadows cast in the closed off area by light passing through the pattern of openings) may be soothing, mystical, relaxing, or otherwise pleasant to various individuals.

The pattern of openings on the panel and/or the mounting frame may include specific ornamental designs, textures and contours that are configured to create an environment that is conducive to prayer and/or meditation. The pattern may suggest or reference historical, cultural or even commercial elements that are configured to assist in defining the purpose of the space.

Embodiments of the present disclosure provide room partition assemblies, systems, and methods that may include specific designs that identify the purpose of particular areas within a vehicle. As an example, if the area is intended to be a prayer space, the designs may be similar to those in houses of worship. The purpose of the defined space may be clear to passengers without having to consult with cabin crew.

Figure 1:
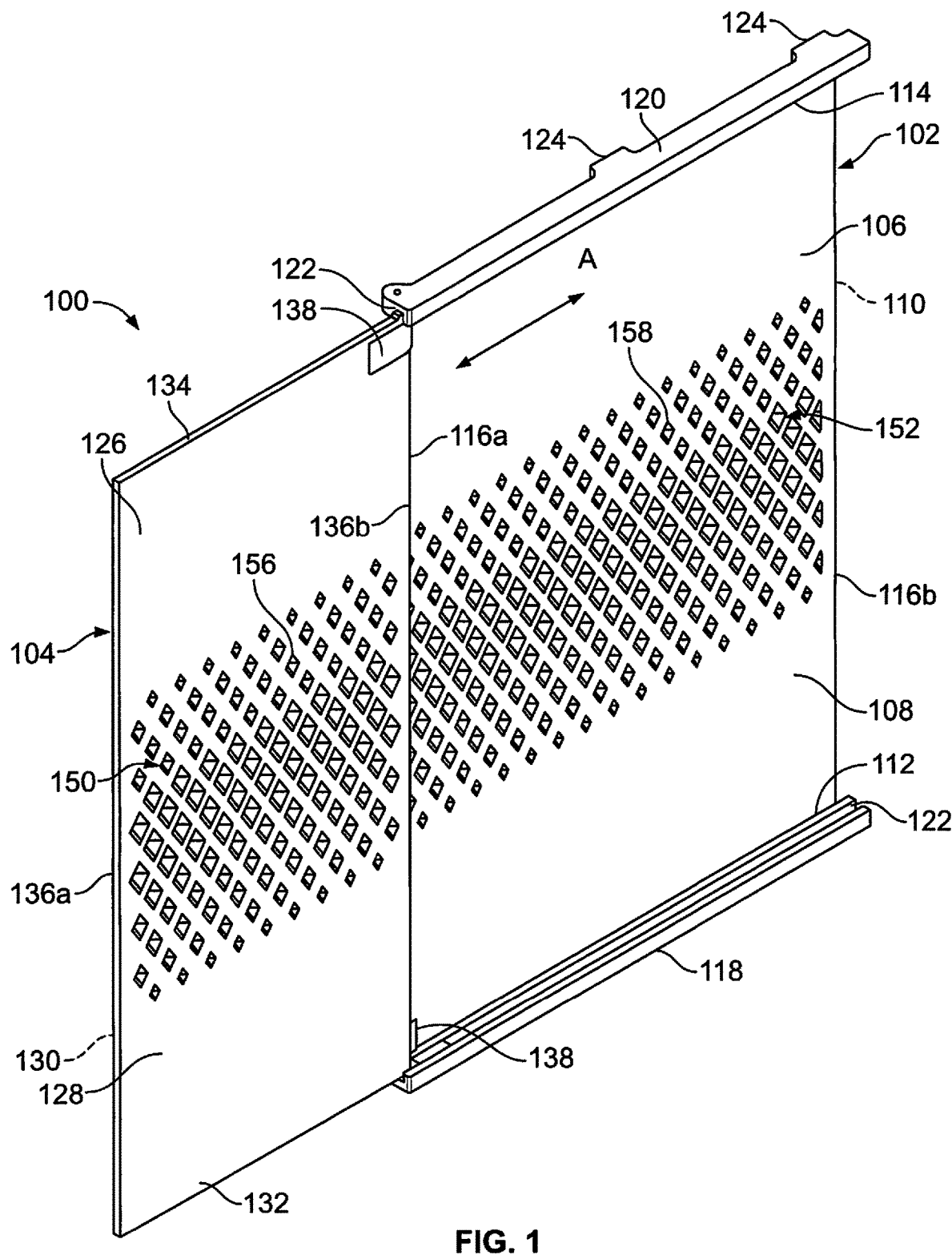
FIG. 1 illustrates a perspective front view of a room partition assembly, according to an embodiment of the present disclosure.
Figures 2, 3:
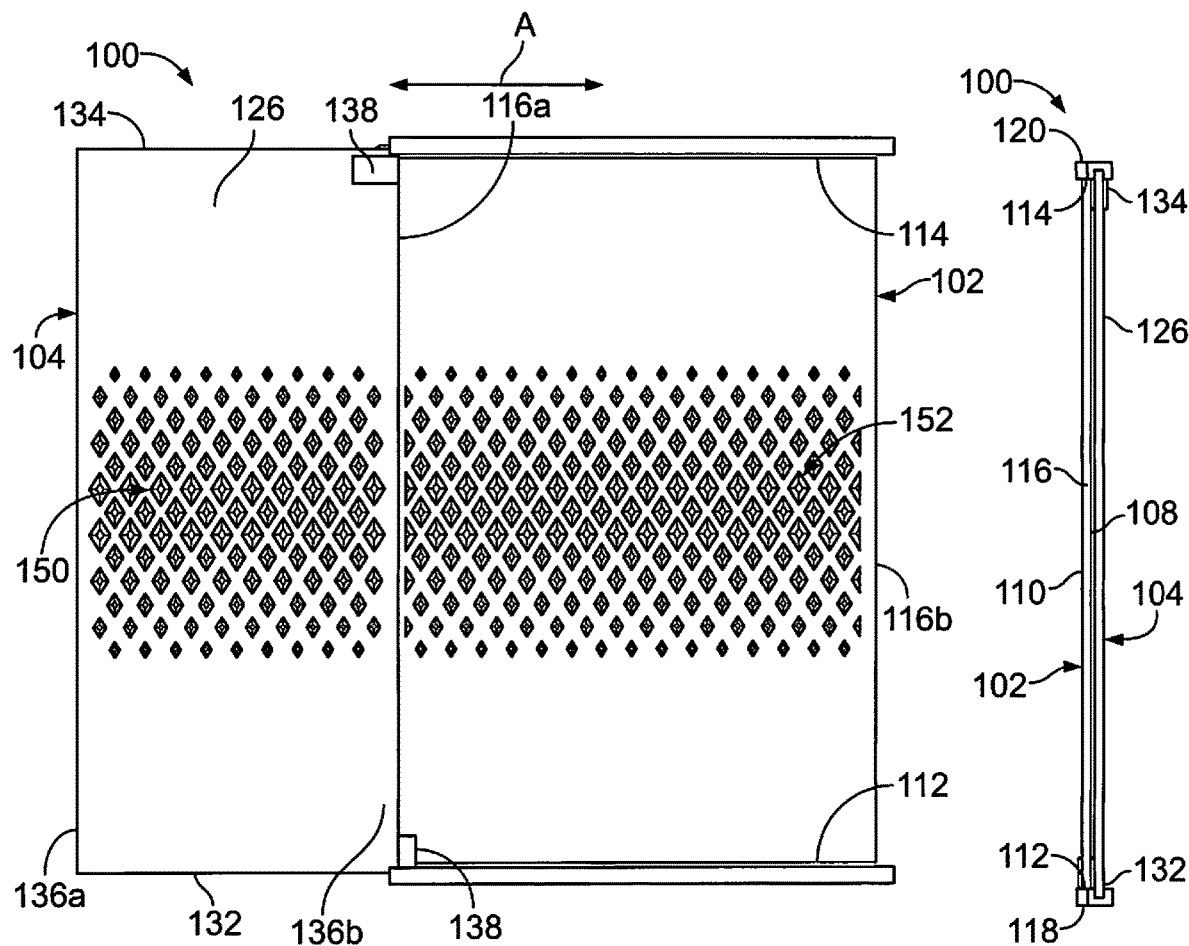
FIG. 2 illustrates a front view of a room partition assembly, according to an embodiment of the present disclosure.
FIG. 3 illustrates an end view of a room partition assembly, according to an embodiment of the present disclosure.
Figure 4:
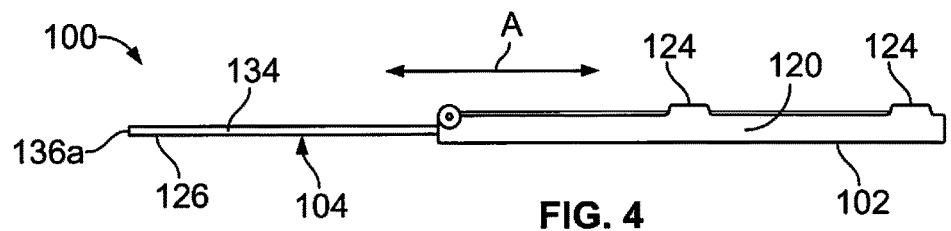
FIG. 4 illustrates a top view of a room partition assembly, according to an embodiment of the present disclosure.
Figure 5:
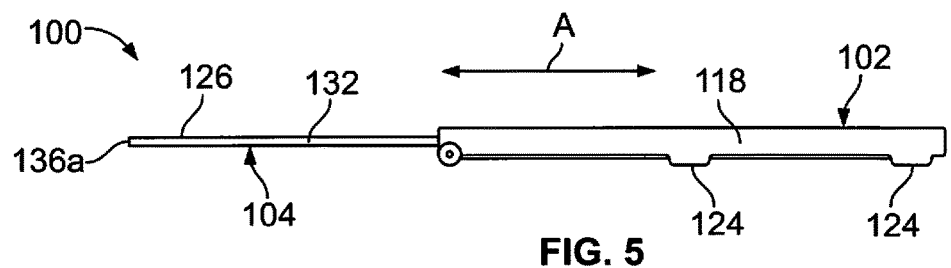
FIG. 5 illustrates a bottom view of a room partition assembly, according to an embodiment of the present disclosure.

FIG. 1 illustrates a perspective front view of a room partition assembly 100, according to an embodiment of the present disclosure. FIG. 2 illustrates a front view of the room partition assembly 100. FIG. 3 illustrates an end view of the room partition assembly 100. FIG. 4 illustrates a top view of the room partition assembly 100. FIG. 5 illustrates a bottom view of the room partition assembly 100.

Referring to FIGS. 1-5, the room partition assembly 100 includes a mounting frame 102 and a panel 104 that is moveably coupled to the mounting frame 102. The panel 104 is configured to be selectively moved in relation to the mounting frame 102 between a retracted position, and an extended position (as shown in FIGS. 1-5).

The mounting frame 102 includes a support wall 106, which may be a planar sheet, panel, or the like that includes a front surface 108 connected to an opposed rear surface 110, such as at a lower edge 112, an upper edge 114, an outer lateral edge 116a, and an inner lateral edge 116b. A lower bracket 118 is secured under and to the lower edge 112, while an upper bracket 120 is secured over and to the upper edge 114.

Each of the lower bracket 118 and the upper bracket 120 includes a track 122 that is configured to slidably retain a portion of the panel 104. The lower bracket 118 and the upper bracket 120 may also include securing members 124 (such as clips, studs, clamps, clasps, latches, and/or the like) that are configured to securely fix the mounting frame 102 to a structure, such as a wall portion of a monument within an internal cabin of a vehicle. Optionally, the mounting frame 102 may be secured to the structure through fasteners, adhesives, and/or the like. In at least one embodiment, the mounting frame 102 may secure to the structure such as through adhesives applied to the rear surface 110, fasteners extending through the support wall 106, and/or the like.

The panel 104 includes a planar main body 126 having a front surface 128 connected to an opposed rear surface 130, such as at a lower edge 132, an upper edge 134, an outer lateral edge 136a, and an inner lateral edge 136b. The lower edge 132 is slidably retained within the track 122 of the lower bracket 118 of the mounting frame 102. The upper edge 134 is slidably retained within the track 122 of the upper bracket 120 of the mounting frame 102.

The panel 104 is configured to be slidably moved in the directions of arrows A between an extended position (shown in FIGS. 1-5), in which the panel 104 is outwardly extended from the mounting frame 102, and a retracted position, in which the panel 104 is retracted into the mounting frame 102. The panel 104 is slidably retained by the tracks 122 of the lower and upper brackets 118 and 120. In the extended position, the outer lateral edge 136a of the panel 104 extends outwardly past the outer lateral edge 116a of the mounting frame 102. In the retracted position, the outer lateral edge 136a of the panel 104 may be recessed within the mounting frame 104, such that the outer lateral edge 116a of the mounting frame 102 extends outwardly past the outer lateral edge 136a of the panel 104.

One or both of the mounting frame 102 and/or the panel 104 may include stops 138 (such as clasps, studs, latches, or the like) that prevent the panel 104 from ejecting from the mounting frame 102. In at least one embodiment, the panel 104 may include one or more stops 138, and the mounting frame 102 may include one or more stops 138. The stops 138 are configured to catch onto a portion of the mounting frame 102 and/or the panel 104 to prevent the panel 104 from ejecting or otherwise disconnecting from the mounting frame 102 in the extended position.

The panel 104 may include a pattern 150 of features, such as shaped openings or holes. The mounting frame 102 may also include a pattern 152. Optionally, the mounting frame 102 may not include the pattern 152. In at least one embodiment, neither the panel 104, nor the mounting frame 102 includes a pattern.

The pattern 150 may be formed by a plurality of openings 156 that are formed through the panel 104 between and through the front surface 128 and the rear surface 130. Similarly, the pattern 152 may be formed by a plurality of openings 158 that are formed through the support wall 106 between and through the front surface 108 and the rear surface 110. At least some of the openings 156 may differ in size and shape. Further, at least some of the openings 158 may differ in size and shape. As shown, the openings 156 and 158 may be diamond-shaped. Optionally, the openings 156 and 158 may be different shapes, such as triangles, trapezoids, crescent shapes, and/or the like. In at least one embodiment, the openings 156 and/or the openings 158 may be filled with glass, which may be transparent or stained different colors. In at least one other embodiment, instead of openings, the pattern 150 and/or the pattern 152 may be or include textured features (such as embossments, divots, channels, and/or the like) formed on the panel 104 and/or the mounting frame 102.

In operation, the room partition assembly 100 is configured to selectively convert an area onboard a vehicle between different uses. For example, the panel 104 is moved into the retracted position to allow the area to be for a standard purpose, such as ingress and egress. The panel 104 is moved into the extended position to close the area off and provide a tranquil, relaxing, soothing, or other such private area for an individual. For example, the individual may peacefully pray within the closed off area when the panel 104 is in the extended position.

Light on an opposite side of the closed off area that shines through the pattern 150 of the panel 104 provides an aesthetically pleasing lighting effect of light and shadows within the closed off area. The lighting effects (such as a pattern of light and shadows cast in the closed off area by light passing through the pattern of openings) may be soothing, mystical, relaxing, or otherwise pleasant to various individuals.

The patterns 150 and/or 152 may include specific shapes, textures, contours, orientations, alignments, and/or the like that are configured to create an environment that is conducive to prayer and/or meditation. The patterns 150 and/or 152 may suggest or reference historical, cultural or even commercial elements that are configured to assist in defining the purpose of the space. For example, if the closed off area is intended to be a prayer space, the patterns 150 and/or 152 may be similar to those in houses of worship.

Figure 6:
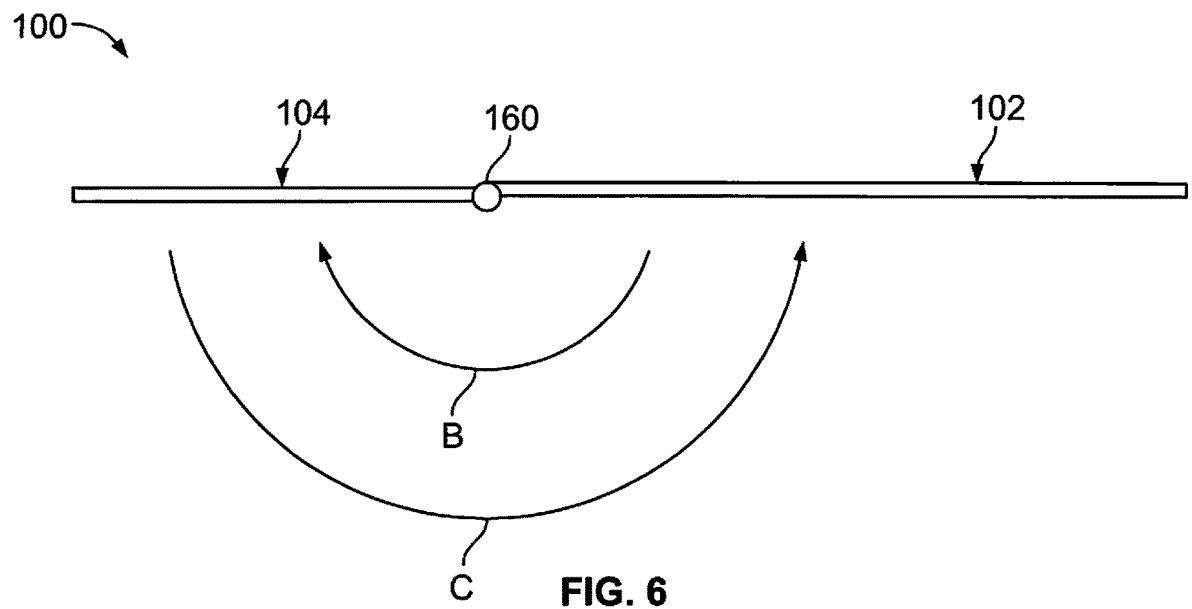
FIG. 6 illustrates a top view of a room partition assembly, according to an embodiment of the present disclosure.

FIG. 6 illustrates a top view of the room partition assembly 100, according to an embodiment of the present disclosure. In this embodiment, the panel 104 is pivotally coupled to the mounting frame 102 about a pivot axle 160. The panel 104 is configured to pivot outwardly from the mounting frame 102 about the pivot axle 160 in the direction of arc B into the extended position. The panel is configured to pivot inwardly towards the mounting frame 102 about the pivot axle 160 in the direction of arc C into the retracted position.

Figure 7:
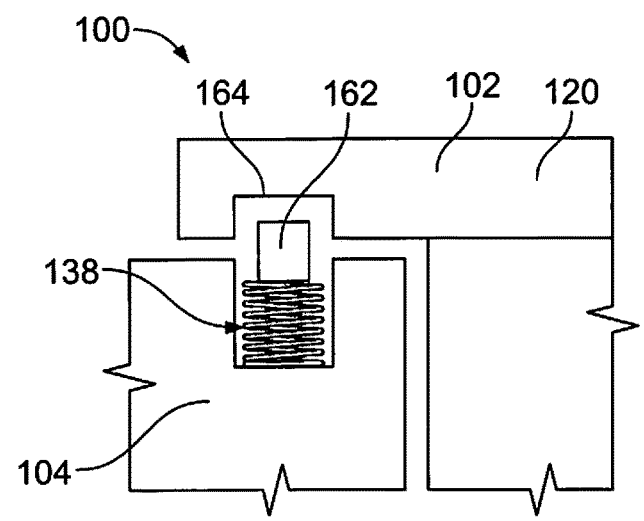
FIG. 7 illustrates a front view of a portion of a room partition assembly, according to an embodiment of the present disclosure.

FIG. 7 illustrates a front view of a portion of the room partition assembly 100, according to an embodiment of the present disclosure. In this embodiment, the panel 104 may include the stop member 138 that includes a spring-biased pin 162 that is configured to extend into a reciprocal channel 164 of the mounting frame 102 in the extended position. As the panel 104 is moved into the extended position, the spring-biased pin(s) 162 move into the channel(s) 164, thereby preventing the panel 104 from disconnecting from the mounting frame 102. Optionally, the panel 104 may include the channel(s) 164, while the mounting frame 102 includes the spring-biased pin(s) 162.

When the pins 162 are retained within the channels 164, the pins 162 may define a pivot axle (similar to the pivot axle 160). In this manner, the panel 104 may be slid out into the extended position as shown in FIGS. 1-5, and also be configured to pivot into open and closed positions. The spring-biased pins 162 may also be operatively coupled to buttons that allow the pins 162 to be moved out of the channel 164, so that the panel 104 may be easily slid back into the retracted position.

Referring to FIGS. 1-7, the room partition assembly 100 is configured to selectively convert an area within an internal cabin of a vehicle between a standard use and a non-standard use. The room partition assembly 100 includes the mounting frame 102, which is configured to be secured to a monument within the internal cabin, and the panel 104, which is moveably coupled to the mounting frame 102. The panel 104 is selectively moved between a retracted position and an extended position with respect to the mounting frame 102. The area is configured for the standard use when the panel 104 is in the retracted position. The area is configured for the non-standard use when the panel 104 is in the extended position.

Figure 8:
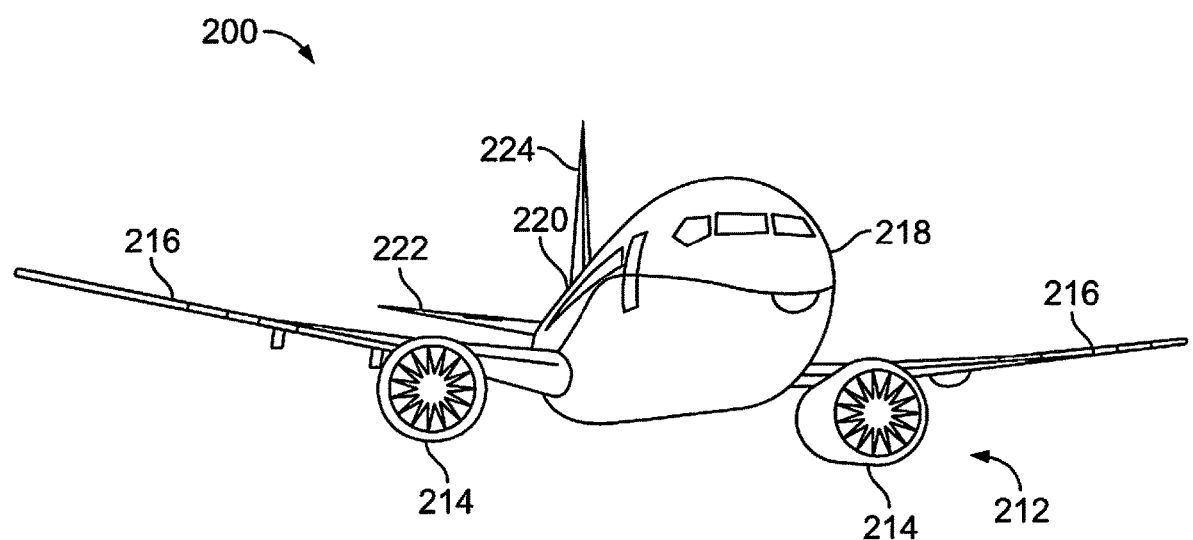
FIG. 8 illustrates a perspective front view of an aircraft, according to an embodiment of the present disclosure.

FIG. 8 illustrates a perspective front view of an aircraft 200, according to an example of the present disclosure. The aircraft 200 includes a propulsion system 212 that may include two turbofan engines 214, for example. Optionally, the propulsion system 212 may include more engines 214 than shown. The engines 214 are carried by wings 216 of the aircraft 200. In other embodiments, the engines 214 may be carried by a fuselage 218 and/or an empennage 220. The empennage 220 may also support horizontal stabilizers 222 and a vertical stabilizer 224.

The fuselage 218 of the aircraft 200 defines an internal cabin, which includes a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class/section divider assemblies. The internal cabin of the aircraft 200 includes one or more convertible areas, which may be converted between uses by the room partition assemblies 100, such as shown and described with respect to FIGS. 1-7.

Alternatively, instead of an aircraft, embodiments of the present disclosure may be used with various other vehicles, such as automobiles, buses, locomotives and train cars, seacraft, spacecraft, and the like.

Figure 9A:
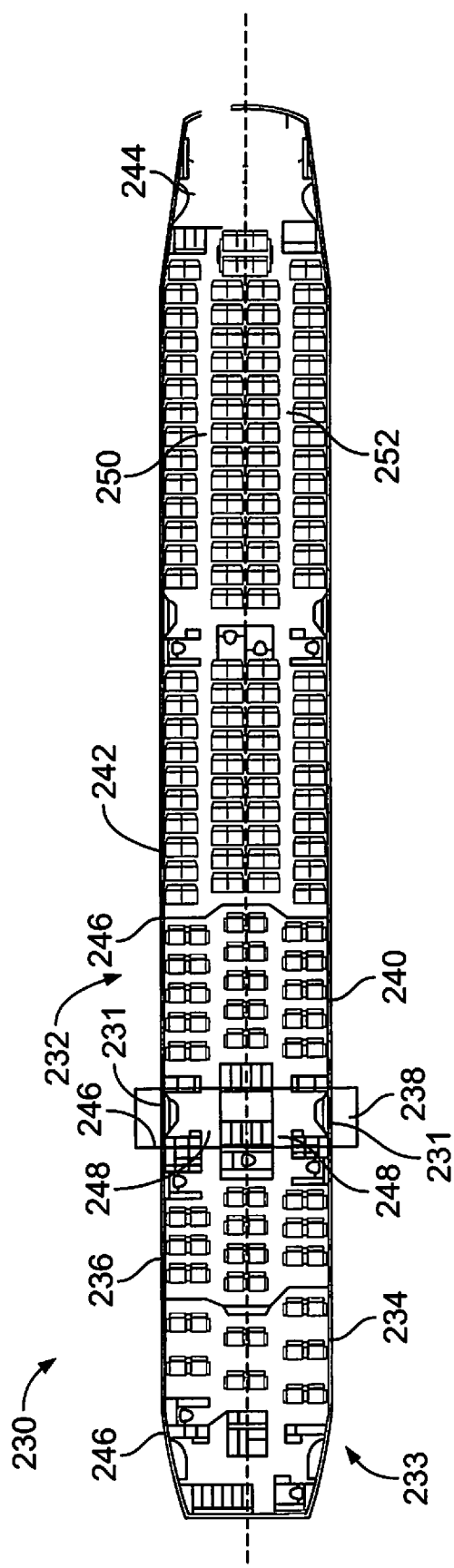
FIG. 9A illustrates a top plan view of an internal cabin of an aircraft, according to an embodiment of the present disclosure.

FIG. 9A illustrates a top plan view of an internal cabin 230 of an aircraft, according to an example of the present disclosure. One or more room partition assemblies 100 (shown in FIGS. 1-7) are within the internal cabin 230, such as at or proximate the entry ways 231. The internal cabin 230 may be within a fuselage 232 of the aircraft 200, shown in FIG. 8. For example, one or more fuselage walls may define the internal cabin 230. The internal cabin 230 includes multiple sections, including a front section 233, a first class section 234, a business class section 236, a front galley station 238, an expanded economy or coach section 240, a standard economy or coach section 242, and an aft section 244, which may include multiple lavatories and galley stations. It is to be understood that the internal cabin 230 may include more or less sections than shown. For example, the internal cabin 230 may not include a first class section, and may include more or less galley stations than shown. Each of the sections may be separated by a cabin transition area 246, which may include class/section divider assemblies between aisles 248.

As shown in FIG. 9A, the internal cabin 230 includes two aisles 250 and 252 that lead to the aft section 244. Optionally, the internal cabin 230 may have less or more aisles than shown. For example, the internal cabin 230 may include a single aisle that extends through the center of the internal cabin 230 that leads to the aft section 244.

Figure 9B:
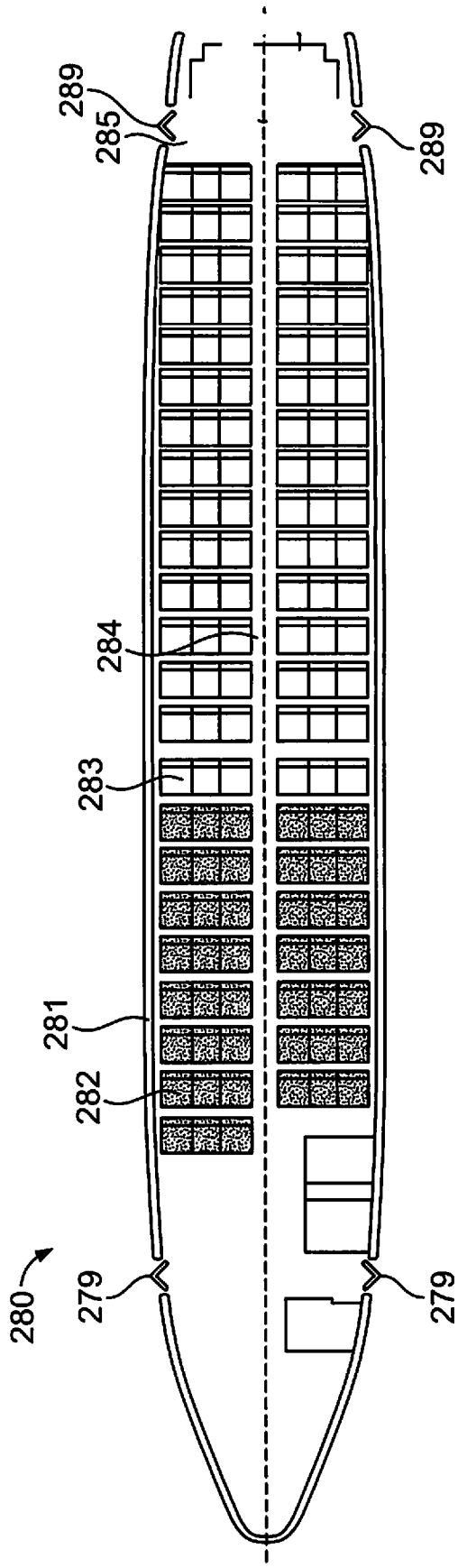
FIG. 9B illustrates a top plan view of an internal cabin of an aircraft, according to an embodiment of the present disclosure.

FIG. 9B illustrates a top plan view of an internal cabin 280 of an aircraft, according to an example of the present disclosure. One or more room partition assemblies 100 (shown in FIGS. 1-7) are within the internal cabin 280, such as at or proximate entry ways 279 and/or emergency exit areas 289. The internal cabin 280 may be within a fuselage 281 of the aircraft 200, shown in FIG. 8. For example, one or more fuselage walls may define the internal cabin 280. The internal cabin 280 includes multiple sections, including a main cabin 282 having passenger seats 283, and an aft section 285 behind the main cabin 282. It is to be understood that the internal cabin 280 may include more or less sections than shown.

The internal cabin 280 may include a single aisle 284 that leads to the aft section 285. The single aisle 284 may extend through the center of the internal cabin 280 that leads to the aft section 285. For example, the single aisle 284 may be coaxially aligned with a central longitudinal plane of the internal cabin 280.

Figure 10:
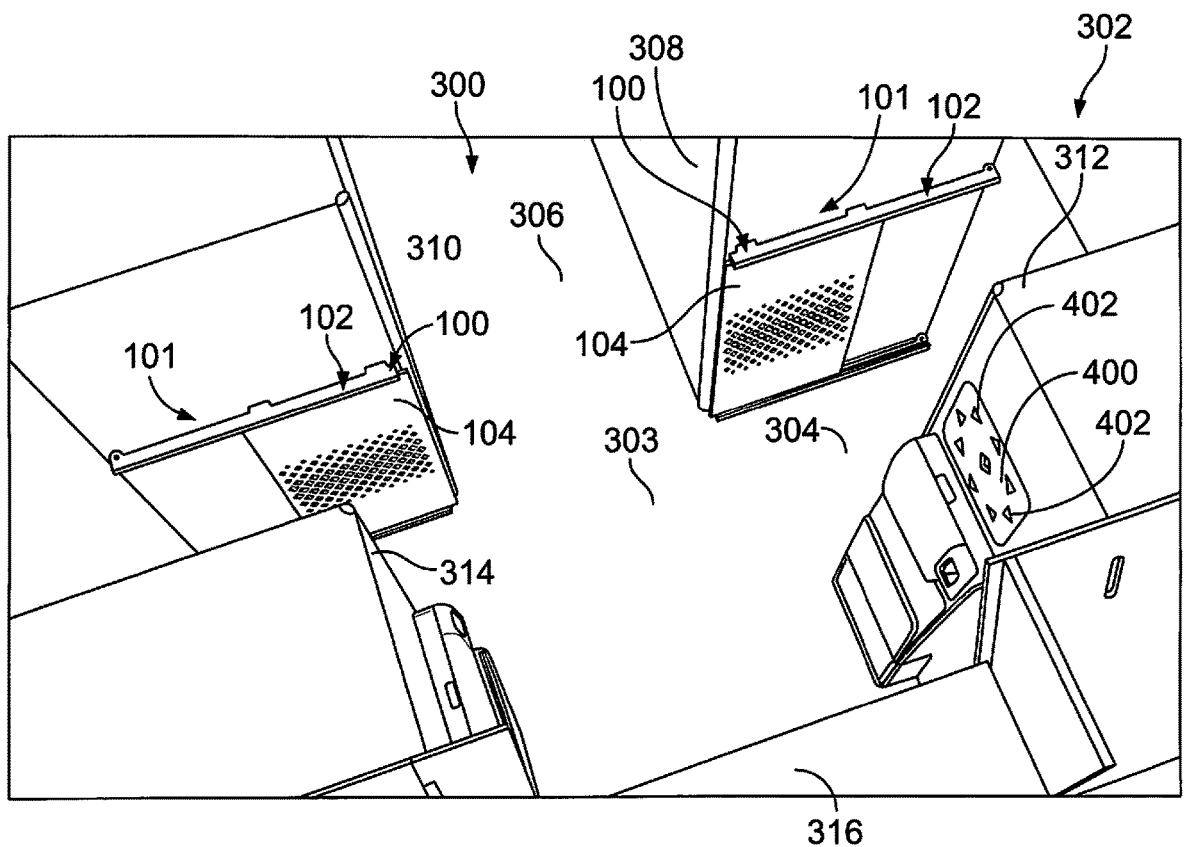
FIG. 10 illustrates a perspective top front view of a convertible area configured for a standard use within an internal cabin of a vehicle, according to an embodiment of the present disclosure.
Figure 11:
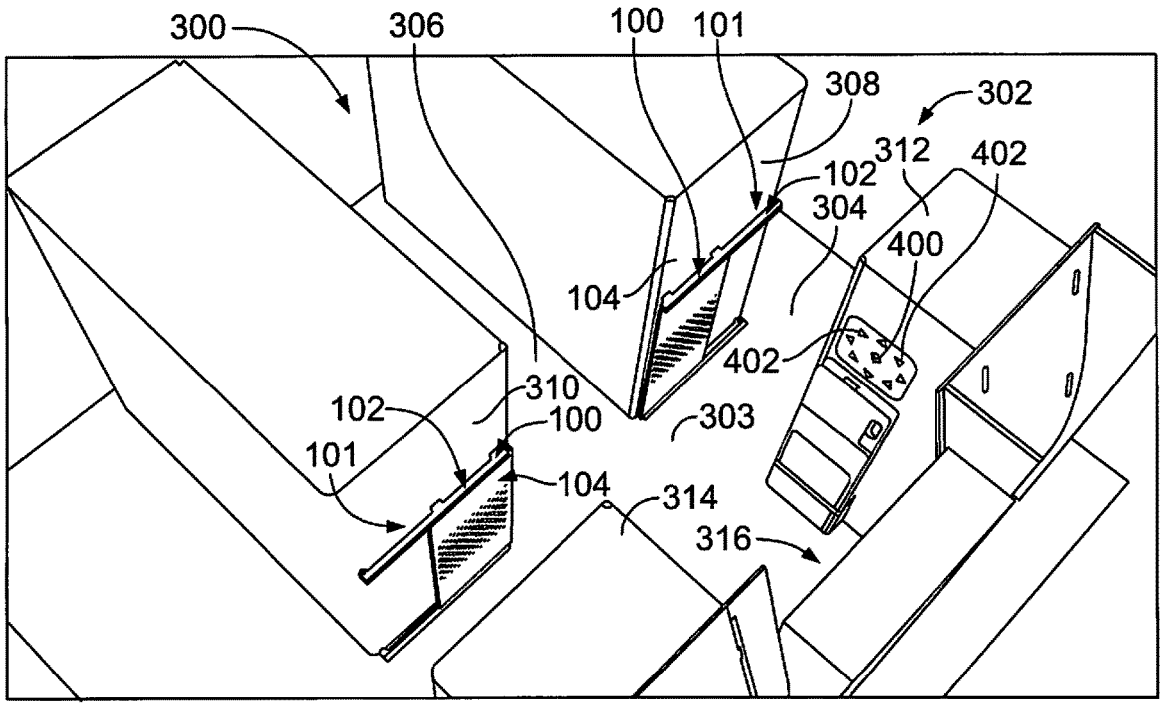
FIG. 11 illustrates a perspective top end view of a convertible area configured for a standard within an internal cabin of a vehicle, according to an embodiment of the present disclosure.

FIG. 10 illustrates a perspective top front view of a convertible area 300 configured for a standard use within an internal cabin 302 of a vehicle (such as the aircraft 200, shown in FIG. 8), according to an embodiment of the present disclosure. FIG. 11 illustrates a perspective top end view of the convertible area 300 configured for a standard use within the internal cabin 302 of the vehicle. Referring to FIGS. 10 and 11, the convertible area 300 may be at a junction of a longitudinal aisle 304 and a cross aisle 306. The cross aisle 306 extends between monuments 308, such as galleys. Additional monuments 312 and 314 (such as closets, lavatories, or the like) may be across the aisle 304 from the monuments 308 and 310. The convertible area 300 may be at an entry way 316 of the vehicle. Optionally, the convertible area 300 may be at various other locations within the vehicle.

As shown, room partition assemblies 100 are secured to the monuments 308 and 310 and face the aisle 304. The mounting frames 102 are securely fixed to the monuments 308 and 310. The room partition assemblies 100 cooperate to provide a room partition system 101 that is configured to selectively convert the area 300 between uses. Optionally, the room partition system 101 may include only one room partition assembly 100.

The room partition assemblies 100 may not extend fully from a floor 303 to a ceiling of the internal cabin 302. Instead, the room partition assemblies 100 may extend from the floor 303 to a level below the ceiling (such as three to five feet above the floor 303). In this manner, a flight attendant may be able to see over the room partition assemblies 100 to check on the status of the convertible area 300. Alternatively, the room partition assemblies 100 may extend to increased heights, such as from the floor 303 to the ceiling.

A direction finder 400 may be secured within the convertible area 300. For example, the direction finder 400 may be secured to the monument 312 and faces towards one or both of the room partition assemblies 100. The direction finder 400 includes a plurality of directional indicia 402 that are configured to be used to determine a location and/or a direction. For example, one of the directional indicia 402 is configured to be illuminated to determine a current location of the vehicle and/or a direction towards a desired location. In at least one embodiment, the convertible area 300 may be used as an Islamic prayer space, and the direction finder 400 may be used to point to a location of Mecca.

As shown, the panels 104 are in retracted positions in relation to the mounting frames 102. When the panels 104 are in the retracted positions, the cross aisle 306 is opened, and the convertible area 302 is not closed off. As such, the convertible area 300 is configured in a standard use, which allows free ingress and egress into and through the cross aisle 306.

In order to change the convertible area 300 into another use (such as a temporary prayer room) that differs from the standard use, the panels 104 are moved outwardly from the mounting frames 102 into the extended positions to close off the cross aisle 306. Curtains within the aisle 304 may also be drawn to provide a closed off prayer room, for example between the curtains and the extended panels 104. Optionally, additional room partition assemblies 100 may be mounted to one or more of the monuments 308, 310, 312, and 314 and configured to have the panels 104 moveably extend to the aisle 304 to close off the aisle 304 (instead of using curtains).

Figure 12:
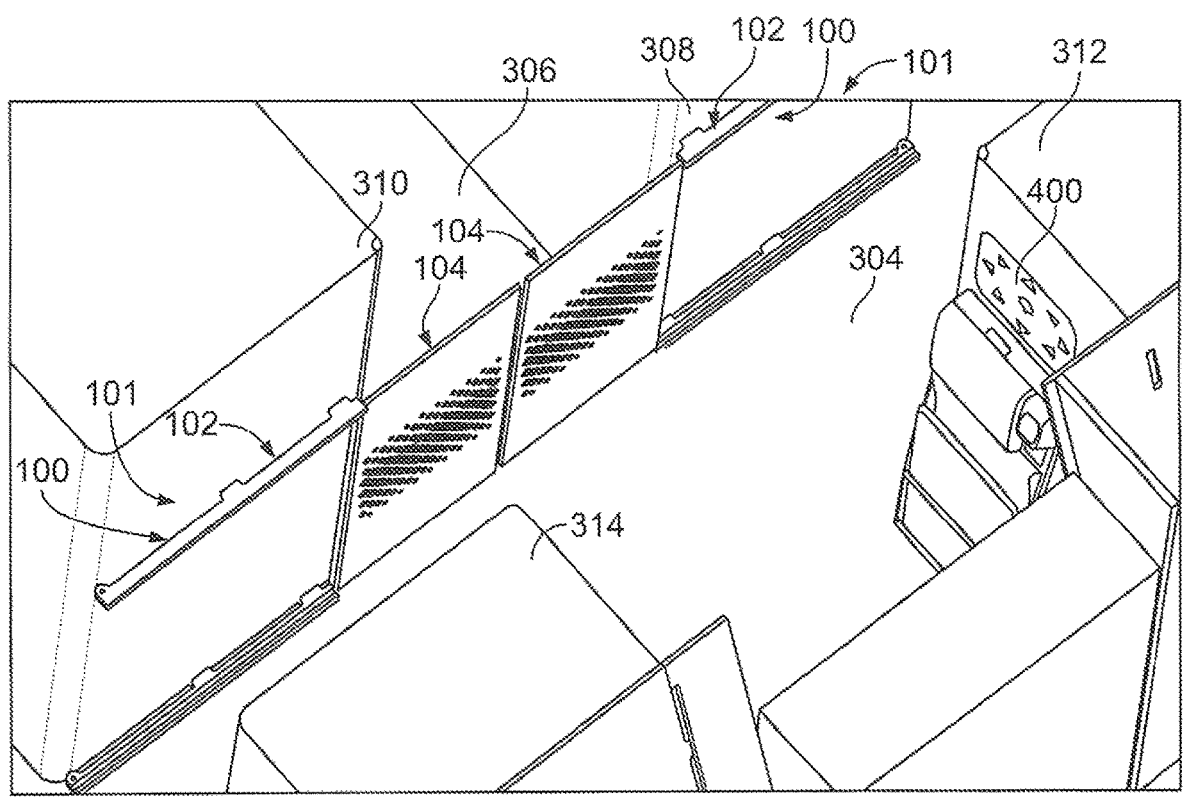
FIG. 12 illustrates a perspective top end view of a convertible area configured for a non-standard use within an internal cabin of a vehicle, according to an embodiment of the present disclosure.
Figure 13:
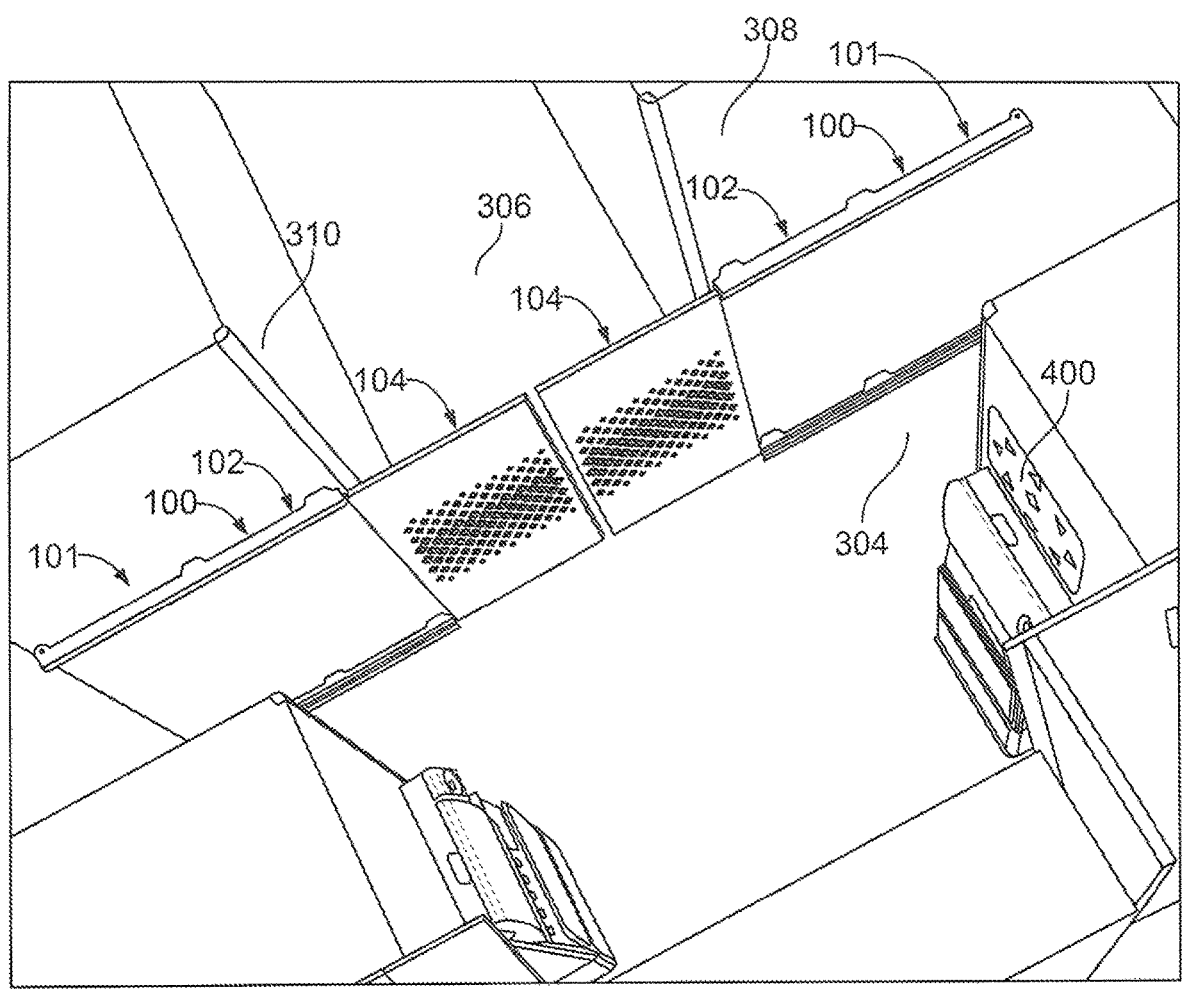
FIG. 13 illustrates a perspective top front view of a convertible area configured for a non-standard use within an internal cabin of a vehicle, according to an embodiment of the present disclosure.
Figure 14:
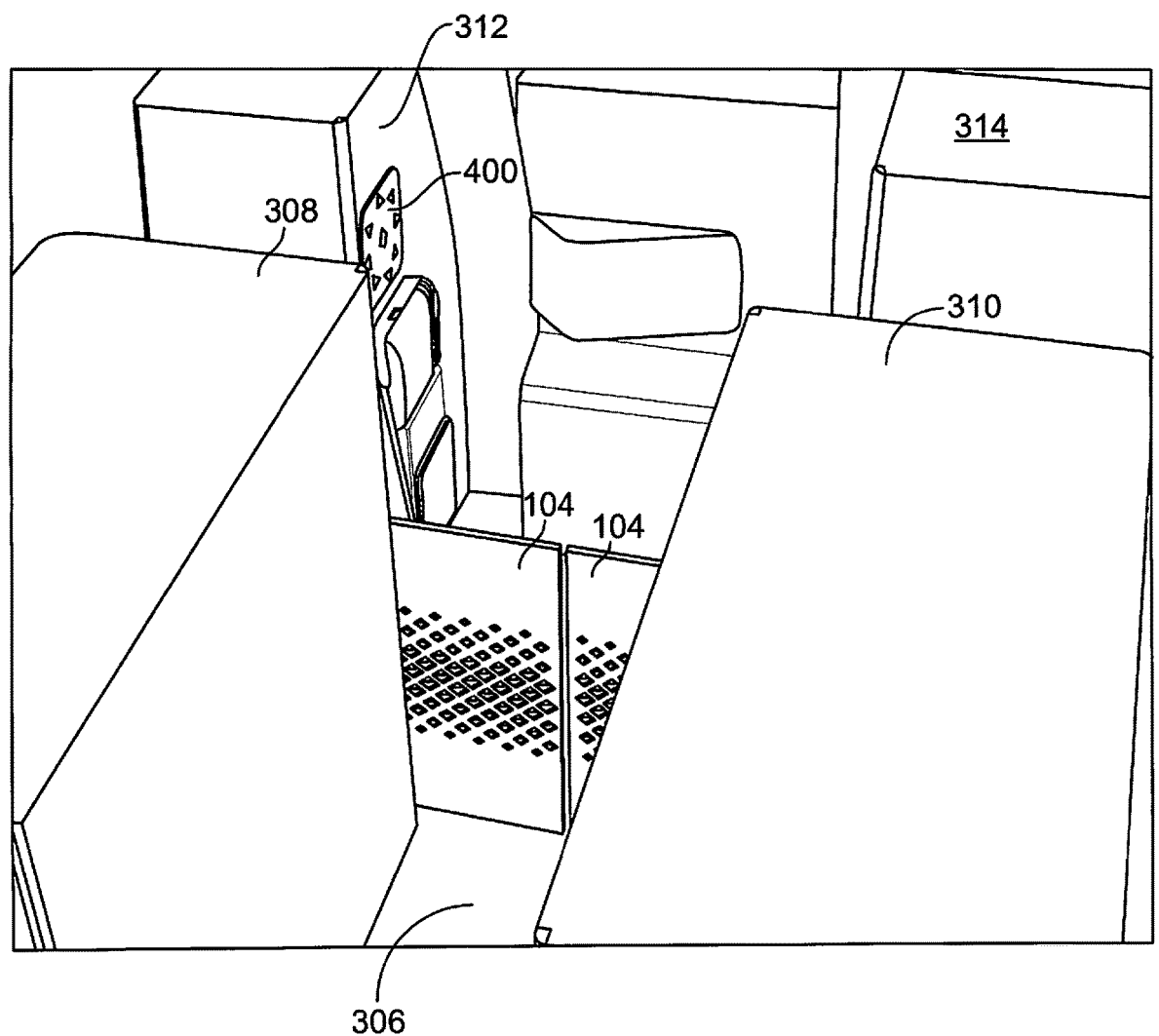
FIG. 14 illustrates a perspective top rear view of a convertible area configured for a non-standard use within an internal cabin of a vehicle, according to an embodiment of the present disclosure.

FIG. 12 illustrates a perspective top end view of the convertible area 300 configured for a non-standard use within the internal cabin 302 of a vehicle. FIG. 13 illustrates a perspective top front view of the convertible area 300 configured for the non-standard use within the internal cabin 302. FIG. 14 illustrates a perspective top rear view of the convertible area 300 configured for the non-standard use within the internal cabin 302.

Referring to FIGS. 12-14, the non-standard use is one other than the standard use (such as for ingress and egress). For example, the non-standard use may be for prayer, meditation, private solace, and/or the like. In order to convert the area 300 into the non-standard use, the panels 104 of the room partition assemblies 100 are moved fully outward from the mounting frames 102 into the extended positions. An individual within the convertible area 300 may view the direction finder 400 to determine a direction towards a particular location, such as an intended direction for prayer.

Figure 15:
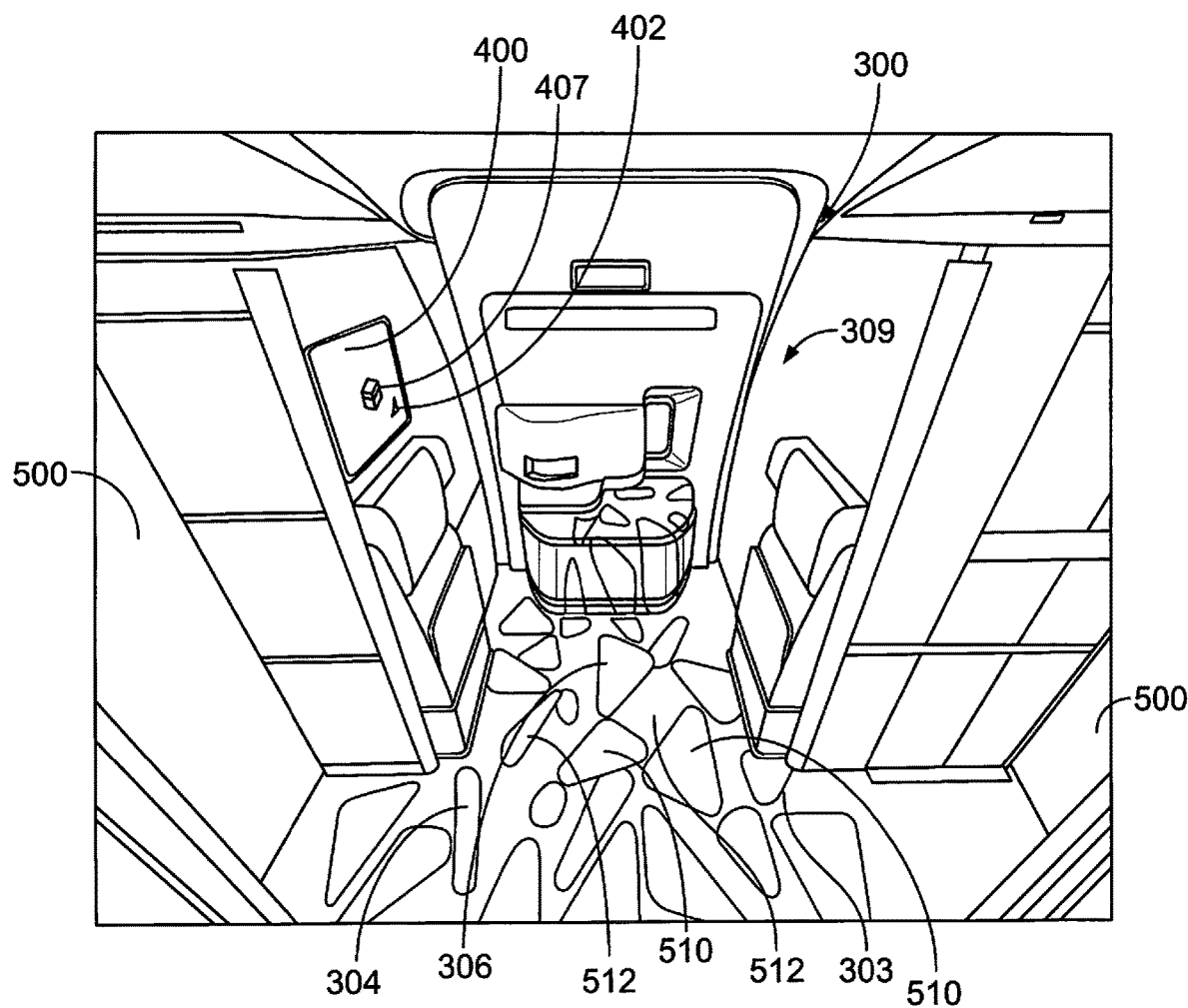
FIG. 15 illustrates a perspective view of a convertible area configured for a non-standard use within an internal cabin of a vehicle, according to an embodiment of the present disclosure.

FIG. 15 illustrates a perspective view of the convertible area 300 configured for a non-standard use within the internal cabin 302 of the vehicle, according to an embodiment of the present disclosure. As shown, curtains 500 may be used to close off the longitudinal aisle 304. Referring to FIGS. 1-5 and 12-15, the panel(s) 104 may be fully extended to close off the cross aisle 306, thereby providing a private, closed off area 309 that may be used for prayer, mediation, and/or the like.

The direction finder 400 may include an illuminated FIG. 407, which may represents a location of interest, such as Mecca. An illuminated directional indicator 402 indicates a direction towards the location of interest.

Light on an opposite side of the closed off area 309 that shines through the pattern 150 of the panel(s) 104 provides an aesthetically pleasing lighting effect of light 510 and shadows 512 on the floor 303 and or internal wall portions of the closed off area 309. The lighting effects (such as a pattern of light 510 and shadows 512 cast in the closed off area 309 by light passing through the pattern 150) may be soothing, mystical, relaxing, or otherwise pleasant to various individuals.

Figure 16:
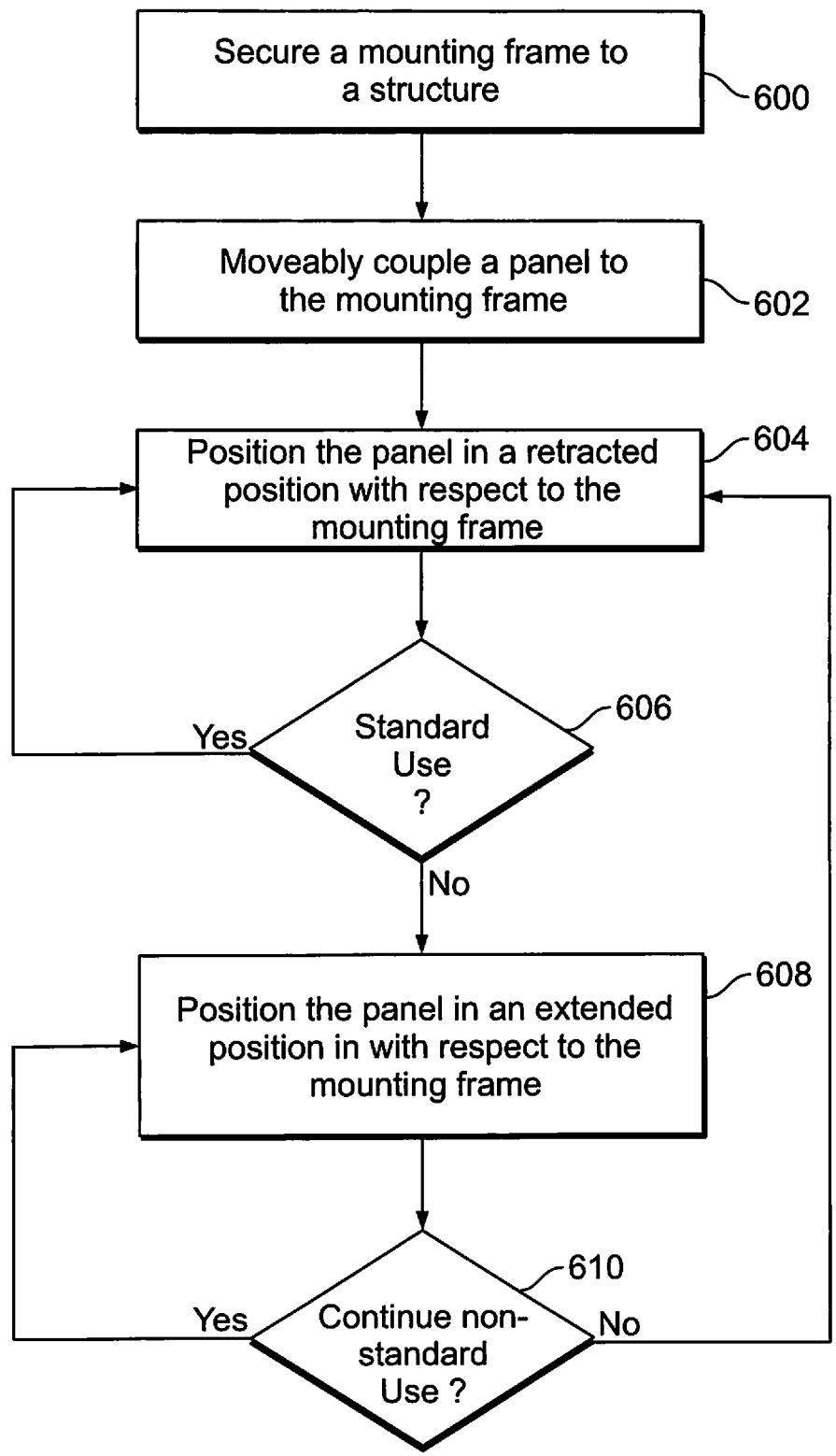
FIG. 16 illustrates a flow chart of a method of selectively converting an area of a vehicle between a standard use and a non-standard use, according to an embodiment of the present disclosure.

FIG. 16 illustrates a flow chart of a method of selectively converting an area of a vehicle between a standard use and a non-standard use, according to an embodiment of the present disclosure. The method begins at 600, at which a mounting frame (such as the mounting frame 102 shown in FIGS. 1-5) is secured to a structure (such as the monument 308 shown in FIG. 10). At 602, a panel (such as the panel 104 shown in FIGS. 1-5) is moveably coupled to the mounting frame. At 604, the panel is positioned in a retracted position with respect to the mounting frame.

At 606, it is determined whether the area is for a standard use, such as boarding or disembarking from the vehicle. If a standard use is intended, the method returns to 604, at which the panel is maintained in the retracted position.

If, however, the area is to be converted to a non-standard use (such as a private prayer space), the method proceeds from 606 to 608, at which the panel is positioned in an extended position with respect to the mounting frame. The method then continues to 610, at which it is determined whether or not to continue the non-standard use. If the non-standard use is to be continued, the method returns to 608, at which the panel is maintained in the extended position. If, however, the area is to be converted back to the standard use, the method returns to 604, at which the panel is moved back to the retracted position.

As described herein, embodiments of the present disclosure provide room partition assemblies 100 that may are configured to convert areas onboard a vehicle into tranquil, private areas, which may be used for praying, mediation, and/or the like. The panels 104 of the room partition assemblies 100 are configured to move into extended positions in order to close off areas onboard a vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A room partition assembly that is configured to selectively convert an area within an internal cabin of an aircraft between a first use and a second use that differs from the first use, wherein the area within the internal cabin is at a junction of a longitudinal aisle and a cross aisle at an entry way of the aircraft, the room partition assembly comprising:

a mounting frame that is configured to be secured to a monument within the internal cabin; and a panel that is moveably coupled to the mounting frame, wherein the panel is selectively moved between a retracted position and an extended position with respect to the mounting frame, wherein the area at the junction of the longitudinal aisle and the cross aisle at the entry way of the aircraft is configured for the first use when the panel is in the retracted position, and wherein the area at the junction of the longitudinal aisle and the cross aisle at the entry way of the aircraft is configured for the second use when the panel is in the extended position, wherein one or both of the mounting frame or the panel comprises a pattern of openings between and through a front surface and a rear surface of one or both of the mounting frame or the panel.

2. The room partition assembly of claim 1, wherein the mounting frame comprises:

a support wall including a front surface connected to an opposed rear surface at a lower edge, an upper edge, an outer lateral edge, and an inner lateral edge;

a lower bracket secured under and to the lower edge; and an upper bracket secured over and to the upper edge, wherein each of the lower bracket and the upper bracket comprises a track that is configured to slidably retain at least one portion of the panel.

3. The room partition assembly of claim 1, wherein both the mounting frame and the panel comprise the pattern of openings.

4. The room partition assembly of claim 1, wherein the pattern of openings are configured to provide lighting effects within the area at the junction of the longitudinal aisle and the cross aisle when the panel is in the extended position, and wherein light passing through the pattern of openings provides the lighting effects.

5. The room partition assembly of claim 1, wherein the pattern of openings comprises a pattern of diamond-shaped openings.

6. The room partition assembly of claim 1, wherein the panel is slidably coupled to the mounting frame.

7. The room partition assembly of claim 1, wherein the panel is pivotally coupled to the mounting frame.

8. The room partition assembly of claim 1, wherein the monument is one of a galley or a closet.

9. The room partition assembly of claim 1, wherein the area at the junction of the longitudinal aisle and the cross aisle comprises a direction finder including a plurality of directional indicia that are configured to indicate a direction towards a desired location outside of the aircraft.

10. The room partition assembly of claim 1, wherein the openings are filled with glass.

11. The room partition assembly of claim 1, wherein the cross aisle is perpendicular to the longitudinal aisle, and wherein the cross aisle extends across the internal cabin between the monument and at least one other monument.

12. A room partition method that is configured to selectively convert an area within an internal cabin of an aircraft between a first use and a second use that differs from the first use, wherein the area within the internal cabin is at a junction of a longitudinal aisle and a cross aisle at an entry way of the aircraft, the room partition method comprising:

providing one or both of a mounting frame or a panel with a pattern of openings between and through a front surface and a rear surface;

securing the mounting frame to a monument within the internal cabin;

moveably coupling the panel to the mounting frame;

selectively moving the panel between a retracted position and an extended position with respect to the mounting frame;

configuring the area at the junction of the longitudinal aisle and the cross aisle at the entry way of the aircraft for the first use when the panel is in the retracted position; and configuring the area at the junction of the longitudinal aisle and the cross aisle at the entry way of the aircraft for the second use when the panel is in the extended position.

13. The room partition method of claim 12, further comprising providing both the mounting frame and the panel with the pattern of openings.

14. The room partition method of claim 12, further comprising emitting light through the pattern of openings to provide lighting effects within the area at the junction of the longitudinal aisle and the cross aisle when the panel is in the extended position.

15. The room partition method of claim 12, wherein the moveably coupling comprises slidably coupling the panel to the mounting frame.

16. The room partition method of claim 12, further comprising providing a direction finder within the area at the junction of the longitudinal aisle and the cross aisle that includes a plurality of directional indicia that are configured to indicate a direction towards a desired location outside of the aircraft.

17. An aircraft comprising:

an internal cabin including an area that is configured to be selectively converted between a first use and a second use that differs from the first use, wherein the area within the internal cabin is at a junction of a longitudinal aisle and a cross aisle at an entry way of the aircraft;

a monument within the internal cabin within or proximate to the area at the junction of the longitudinal aisle and the cross aisle;

a direction finder secured to the monument, wherein the direction finder includes a plurality of directional indicia that are configured to indicate a direction towards a desired location outside of the aircraft; and a room partition assembly that is configured to selectively convert the area at the junction of the longitudinal aisle and the cross aisle between the first use and the second use, the room partition assembly comprising:

a mounting frame secured to the monument; and a panel that is moveably coupled to the mounting frame, wherein the panel is selectively moved between a retracted position and an extended position with respect to the mounting frame, wherein the area at the junction of the longitudinal aisle and the cross aisle is configured for the first use when the panel is in the retracted position, and wherein the area at the junction of the longitudinal aisle and the cross aisle is configured for the second use when the panel is in the extended position, wherein the panel comprises a pattern of features including a pattern of openings between and through a front surface and a rear surface of the panel, wherein the pattern of openings are configured to provide lighting effects within the area at the junction of the longitudinal aisle and the cross aisle when the panel is in the extended position, wherein light passing through the pattern of openings provides the lighting effects.

18. The aircraft of claim 17, wherein the mounting frame comprises:

a support wall including a front surface connected to an opposed rear surface at a lower edge, an upper edge, an outer lateral edge, and an inner lateral edge;

a lower bracket secured under and to the lower edge; and an upper bracket secured over and to the upper edge, wherein each of the lower bracket and the upper bracket comprises a track that is configured to slidably retain at least one portion of the panel.

19. The aircraft of claim 17, wherein the openings are filled with glass.

20. The aircraft of claim 17, wherein the cross aisle is perpendicular to the longitudinal aisle, and wherein the cross aisle extends across the internal cabin between the monument and at least one other monument.

* * * * *